(12) United States Patent
Yamaguchi et al.

(10) Patent No.: US 9,090,355 B2
(45) Date of Patent: Jul. 28, 2015

(54) COMPOSITE TANK, WING, AND METHOD FOR MANUFACTURING COMPOSITE TANK

(75) Inventors: Hiroaki Yamaguchi, Nagoya (JP); Yuichiro Kamino, Nagoya (JP); Koichi Nakamura, Nagoya (JP); Tooru Hashigami, Nagoya (JP)

(73) Assignees: MITSUBISHI HEAVY INDUSTRIES, LTD., Tokyo (JP); THE SOCIETY OF JAPANESE AEROSPACE COMPANIES, Tokyo (JP)

( * ) Notice: Subject to any disclaimer, the term of this patent is extended or adjusted under 35 U.S.C. 154(b) by 393 days.

(21) Appl. No.: 13/258,179

(22) PCT Filed: Mar. 17, 2010

(86) PCT No.: PCT/JP2010/054520
§ 371 (c)(1),
(2), (4) Date: Sep. 21, 2011

(87) PCT Pub. No.: WO2010/113640
PCT Pub. Date: Oct. 7, 2010

(65) Prior Publication Data
US 2012/0012710 A1    Jan. 19, 2012

(30) Foreign Application Priority Data
Mar. 30, 2009   (JP) ................................. 2009-083366

(51) Int. Cl.
*B64D 15/04*   (2006.01)
*B64D 37/06*   (2006.01)
(Continued)

(52) U.S. Cl.
CPC . *B64D 37/06* (2013.01); *B64C 3/34* (2013.01); *B64D 37/32* (2013.01); *Y02T 50/44* (2013.01)

(58) Field of Classification Search
USPC .............................................. 244/133, 135 R
See application file for complete search history.

(56) References Cited

U.S. PATENT DOCUMENTS 5,637,272 A    6/1997  Yamamoto et al.
5,845,872 A *  12/1998 Pridham et al. ............... 244/1 A
(Continued)

FOREIGN PATENT DOCUMENTS

CN    1092240    9/1994
CN    101309552   11/2008
(Continued)

OTHER PUBLICATIONS

Russian Decision of Patent Grant issued Jan. 19, 2013 in corresponding Russian Patent Application No. 2011139012 with English explanation of relevance.
(Continued)

*Primary Examiner* — Timothy D Collins
*Assistant Examiner* — Keith L Dixon
(74) *Attorney, Agent, or Firm* — Wenderoth, Lind & Ponack, L.L.P.

(57) ABSTRACT

A composite tank that can suppress electrification, corrosion and strength degradation, a wing comprising the composite tank, and a method for manufacturing the composite tank. The composite tank comprises: a tank body inside which a combustible material is stored, having a first resin portion (11, 12) formed from a fiber reinforced resin and a metal portion formed from a metal material, a second resin portion (22) formed from a fiber reinforced resin, which covers at least those regions on the inner surface of the tank body where the first resin portion (11, 12) adjoins the metal portion, and a plurality of conductive portions (23) that enable charge transfer through the second resin portion (22), from the surface that contacts the combustible material to the first resin portion (11, 12), wherein the fiber in the second resin portion (22) has a higher electrical resistivity than fiber in the first resin portion (11, 12), and the second resin portion (22) forms a layer that isolates the first resin portion (11, 12) from the metal portion.

4 Claims, 3 Drawing Sheets

(51) Int. Cl.
*B64C 3/34* (2006.01)
*B64D 37/32* (2006.01)

(56) References Cited

U.S. PATENT DOCUMENTS

| | | | |
|---|---|---|---|
| 7,277,266 | B1 * | 10/2007 | Le et al. .................... 361/218 |
| 7,934,676 | B2 * | 5/2011 | Dufresne et al. .............. 244/1 A |
| 8,550,403 | B2 * | 10/2013 | Yamaguchi et al. ...... 244/135 R |
| 2008/0013246 | A1 | 1/2008 | Berenguer Monge et al. |
| 2008/0137259 | A1 | 6/2008 | Heeter et al. |
| 2008/0308678 | A1 | 12/2008 | Purdy et al. |

FOREIGN PATENT DOCUMENTS

| | | |
|---|---|---|
| JP | 07-033089 | 2/1995 |
| JP | 07-172395 | 7/1995 |
| JP | 08-001690 | 1/1996 |
| JP | 2001-304492 | 10/2001 |
| JP | 2003-226296 | 8/2003 |
| JP | 2008-120989 | 5/2008 |
| JP | 2009-509848 | 3/2009 |
| WO | 2006/069996 | 7/2006 |
| WO | 2007/039650 | 4/2007 |

OTHER PUBLICATIONS

International Search Report issued Apr. 20, 2010 in International (PCT) Application No. PCT/JP2010/054520.
M. Yamaguma et al., "Propagating Brush Discharge Occurring on Insulating Inner-Bag Used with Anti-Static FIBC and Its Countermeasures", Research Reports of the National Institute of Industrial Safety, NIIS-RR-2000 (2001), pp. 35-43, w/ English language Abstract.
Japanese Decision to Grant a Patent issued Mar. 5, 2013 in corresponding Japanese Patent Application No. 2009-083366 with Explanation of Relevance.
Chinese Office Action issued Jan. 5, 2013 in corresponding Chinese Patent Application No. 201080014209.3 with English translation.
Canadian Notice of Allowance issued Oct. 17, 2013 in corresponding Canadian Patent Application No. 2,755,713.
Notice of Allowance issued Mar. 26, 2015 in corresponding Chinese Application No. 201080014209.3 (please see item 3f on IDS transmittal for concise explanation of reference).

* cited by examiner

COMPOSITE TANK, WING, AND METHOD FOR MANUFACTURING COMPOSITE TANK

TECHNICAL FIELD

The present invention relates to a tank inside which a fuel is stored, and relates particularly to a composite tank that is ideal for application to a tank that is formed as an integral part of the wing of an aircraft (hereinafter referred to as an "integral tank"), a wing provided with such a composite tank, and a method for manufacturing the composite tank.

BACKGROUND ART

Conventionally, most fuel tanks used for storing fuel have been formed from a metal such as an aluminum alloy, and particularly in the case of integral tanks in the aircraft field, some or all of the members that constitute the tank are the same metal members that constitute the main wing, and have therefore been formed from a metal.

In recent years, in the field of transport machinery including aircraft, composite materials such as reinforced plastics have started to be used for structural elements such as the airframe or main wings in order to achieve weight reduction and associated improvements in performance.

In such cases, some or all of the integral tank, which is formed from the same components that constitute the main wing, is formed from a composite material. A variety of fuel tanks formed from composite materials have been proposed (for example, see Patent Literature 1 and 2).

CITATION LIST

Patent Literature

{PTL 1} Japanese Unexamined Patent Application, Publication No. Hei 07-172395
{PTL 2} Japanese Unexamined Patent Application, Publication No. Hei 07-033089

SUMMARY OF INVENTION

Technical Problem

For example, if a carbon fiber reinforced plastic (hereinafter abbreviated as "CFRP") is used as the reinforced plastic that constitutes the fuel tank, then when the CFRP is subjected to cutting work in order to form the through-holes and the like used for joining the CFRP to reinforcing members and the like, burrs tend to develop around the periphery of the cut portions. The occurrence of these burrs tend to make the CFRP more prone to strength degradation.

Moreover, if the other structural member used in the joint mentioned above is formed from a material such as aluminum that has a different electric potential from the CFRP, then a local cell is formed at the contact portion between the other structural member and the fuel tank, and if these materials of differing electric potentials make contact via an electrolyte solution such as water, then corrosion tends to occur in the metal, which has the lower electric potential.

In other words, the carbon fibers of the CFRP are as electrically inert as the noble metals, and exhibit a higher level of stability than more electrically reactive metal materials such as aluminum. As a result, a problem arises in that when the structural members and the fuel tank make contact, the less stable structural members tend to suffer from corrosion.

In one known method of addressing the above problem associated with using a CFRP, a glass fiber reinforced plastic (hereinafter abbreviated as "GFRP") is provided as a surface layer on the members formed from the CFRP.

However, because GFRP is an insulating material, a problem arises in that electrification tends to occur as a result of a flow electrification phenomenon between the fuel and the fuel tank.

Moreover, this type of electrification, which can potentially act as an ignition source, fails to comply with U.S. Federal Aviation Regulations (FAR 25.981), meaning it is difficult to apply the above structure to use within an aircraft fuel tank.

In conventional fuel tanks formed from a metal such as an aluminum alloy, because the metal such as the aluminum alloy has a high level of conductivity, electrification caused by the flow electrification phenomenon between the fuel and the fuel tank is unlikely to occur.

The present invention has been developed to address the issues described above, and has an object of providing a composite tank that can suppress electrification and corrosion, as well as suppressing strength degradation. The invention also provides a wing comprising the composite tank and a method for manufacturing the composite tank.

Solution to Problem

In order to achieve the object described above, the present invention adopts the aspects described below.

A composite tank according to a first aspect of the present invention comprises a tank body inside which a combustible material is stored, the tank body having a first resin portion formed from a fiber reinforced resin and a metal portion formed from a metal material, a second resin portion formed from a fiber reinforced resin, which covers at least those regions on the inner surface of the tank body where the first resin portion adjoins the metal portion, and a plurality of conductive portions that enable charge transfer through the second resin portion, from the surface that contacts the combustible material through to the first resin portion, wherein the fiber incorporated within the second resin portion has a higher electrical resistivity than the fiber incorporated within the first resin portion, and the second resin portion forms a layer that isolates the first resin portion from the metal portion.

In the composite tank according to the first aspect of the present invention described above, because the second resin portion is provided with the conductive portions, the amount of charge borne by the second resin portion is reduced compared with the case where no conductive portions are provided.

For example, in the case where the combustible material stored in the tank body is a liquid such as a fuel, flow electrification will occur on the inner surface of the tank body. Because the fiber incorporated within the second resin portion has a higher electrical resistivity than the fiber incorporated within the first resin portion, the second resin portion bears an electrical charge more readily than the first resin portion. At this time, when the amount of charge in the vicinity of a conductive portion in the second resin portion reaches a certain value, the charge borne by the second resin portion is transferred through the conductive portion to the first resin portion.

Because the second resin portion is disposed so as to cover those regions where the first resin portion adjoins the metal portion, or in other words, because the second resin portion is interposed between the first resin portion and the metal portion, corrosion of the metal portion can be suppressed.

In other words, the second resin portion functions as a layer that isolates the first resin portion and the metal portion, and therefore compared with the case where the first resin portion and the metal portion make direct contact, the metal material that constitutes the metal portion is more resistant to ionization. As a result, corrosion of the metal material is less likely than in the case where the first resin portion and the metal portion make direct contact.

In the composite tank according to the first aspect described above, the conductive portions are preferably portions formed solely from the resin, and penetrate from the surface that contacts the combustible material through to the first resin portion.

By employing this structure, corrosion of the metal portion can be suppressed better than in the case where through-hole shaped conductive portions are provided in the second resin portion.

In other words, because the first resin portion is covered with conductive portions formed solely from the resin, the first resin portion cannot make contact with any moisture or the like contained within the combustible material. Accordingly, the metal portion cannot make electrical contact with the fibers incorporated within the first resin portion via such moisture, meaning corrosion of the metal portion is inhibited.

In the composite tank according to the first aspect described above, the second resin portion is preferably formed by arranging the fibers in a planar pattern and then impregnating the fibers with the resin, and the conductive portions are preferably portions from which the fibers have been removed.

Examples of the planar pattern of the fibers include items formed by intersecting the fibers, and preferably single-layer woven fabrics such as plain-woven fabrics and sateen-weave fabrics. Other examples of patterns that may be used include unidirectional materials in which the fibers are aligned in parallel.

By employing this type of structure, the conductive portions can be formed easily, without forming burrs and the like that can cause a deterioration in the strength of the composite tank.

Specifically, the above structure may by formed either by preparing a material in which the fibers are arranged in a planar pattern, removing the fibers from certain portions, and then impregnating the fibers with the resin, thereby forming the second resin portion and the conductive portions in an integrated manner, or by impregnating a material in which the fibers have been arranged in a planar pattern with the resin, and subsequently forming the portions from which the fibers have been removed.

In this manner, conductive portions can be formed that are formed solely from the resin, and penetrate from the surface of the second resin portion that contacts the combustible material through to the first resin portion.

Examples of the method used for removing the fibers from certain portions include methods of extracting a portion of the fibers from the planar pattern, and methods of cutting a portion of the fibers from the planar pattern.

Alternatively, a material prepared by arranging the fibers in a planar pattern and then impregnating the fibers with the resin may be laid up (laminated) on the first resin portion or the uncured first resin portion, and following curing of the resin, pinholes that function as the conductive portions may be formed either physically or by application of a voltage.

A wing according to a second aspect of the present invention is provided with the composite tank of the present invention described above, wherein the first resin portion of the composite tank constitutes at least a portion of the wing box.

In the wing according to the second aspect of the present invention, because the composite tank of the present invention is provided in an integral manner, electrification and corrosion can be suppressed, and strength degradation can also be suppressed.

Here, the term "wing box" used in relation to the first resin portion in the composite tank refers to the main structural region of the wing, which is composed of a combination of an upper skin panel and lower skin panel that represent the outer panels of the wing, front and rear spars, ribs, and stringers and the like. The expression "at least a portion of the wing box" describes at least one of the upper skin panel, the lower skin panel, the spars, the ribs and the stringers.

Examples of the combination of the first resin portion and the metal portion formed from a metal material include a combination of upper and lower skin panels formed from the first resin portion and ribs formed from the metal material, a combination of upper and lower skin panels formed from the first resin portion and connection components formed from metal materials (hereinafter referred to as "metal components"), such as fasteners, shear ties and shear clips and the like, a combination of spars formed from the first resin portion and ribs formed from the metal material, a combination of spars formed from the first resin portion and metal components, a combination of ribs formed from the first resin portion and metal components, and a combination of stringers formed from the first resin portion and metal components.

A method for manufacturing a composite tank according to a third aspect of the present invention is a method for manufacturing a composite tank comprising a tank body inside which a combustible material is stored, the tank body having a first resin portion formed from a fiber reinforced resin and a metal portion formed from a metal material, a second resin portion formed from a fiber reinforced resin, which covers those regions on the inner surface of the tank body where the first resin portion adjoins the metal portion, and a plurality of conductive portions formed within the second resin portion that are formed solely from the resin and penetrate from the surface that contacts the combustible material through to the first resin portion, the method comprising a step of forming the fibers of the second resin portion in a planar pattern and then removing a portion of the fibers, a step of impregnating the fibers that have been formed in a planar pattern with the resin to form a prepreg, and a step of curing the resin impregnated within the prepreg.

Examples of the method used for forming the fibers in a planar pattern include methods of intersecting the fibers, and preferably methods that involve formation of a single-layer woven fabric such as a plain-woven fabric or sateen-weave fabric.

A method for manufacturing a composite tank according to a fourth aspect of the present invention is a method for manufacturing a composite tank comprising a tank body inside which a combustible material is stored, the tank body having a first resin portion formed from a fiber reinforced resin and a metal portion formed from a metal material, a second resin portion formed from a fiber reinforced resin, which covers those regions on the inner surface of the tank body where the first resin portion adjoins the metal portion, and a plurality of conductive portions formed within the second resin portion that are formed solely from the resin and penetrate from the surface that contacts the combustible material through to the first resin portion, the method comprising a step of forming the fibers of the second resin portion in a planar pattern, a step of impregnating the fibers that have been formed in a planar pattern with the resin to form a prepreg, a step of removing a portion of the fibers from the prepreg, and a step of curing the resin impregnated within the prepreg.

By employing the method for manufacturing a composite tank according to the fourth aspect of the present invention described above, the conductive portions can be formed easily without requiring the type of cutting work that can cause strength degradation of the tank body.

Specifically, by preparing a material in which the fibers are formed in a planar pattern, forming portions in the material from which the fibers have been removed, and then impregnating the material with resin, or alternatively, by impregnating a material in which the fibers are formed in a planar pattern with resin to form a prepreg, and then forming portions in the prepreg from which the fibers have been removed, the second resin portion and the conductive portions can be formed in an integrated manner. As a result, conductive portions formed solely from the resin, which penetrate from the surface of the second resin portion that contacts the combustible material through to the first resin portion, can be formed without requiring cutting work.

A method for manufacturing a composite tank according to a fifth aspect of the present invention is a method for manufacturing a composite tank comprising a tank body inside which a combustible material is stored, the tank body having a first resin portion formed from a fiber reinforced resin and a metal portion formed from a metal material, a second resin portion formed from a fiber reinforced resin, which covers those regions on the inner surface of the tank body where the first resin portion adjoins the metal portion, and a plurality of conductive portions formed within the second resin portion that are formed solely from the resin and penetrate from the surface that contacts the combustible material through to the first resin portion, the method comprising a step of forming the fibers of the second resin portion in a planar pattern, a step of impregnating the fibers that have been formed in a planar pattern with the resin to form a prepreg, a step of curing the resin impregnated within the prepreg, and a step of forming the plurality of conductive portions in the second resin portion comprising the cured resin, either physically or by applying a voltage.

By employing the method for manufacturing a composite tank according to the fifth aspect described above, the conductive portions can be formed easily without degrading the strength of the tank body.

Advantageous Effects of Invention

According to the composite tank, the wing comprising the composite tank, and the method for manufacturing a composite tank of the present invention, the second resin portion is disposed so as to cover those regions of the first resin portion adjoining the metal portion, and conductive portions are provided in the second resin portion, and therefore flow electrification and corrosion can be suppressed, and productivity can be improved.

DESCRIPTION OF EMBODIMENTS

A main wing according to an embodiment of the present invention is described below with reference to FIG. 1 to FIG. 4.

Figure 1:
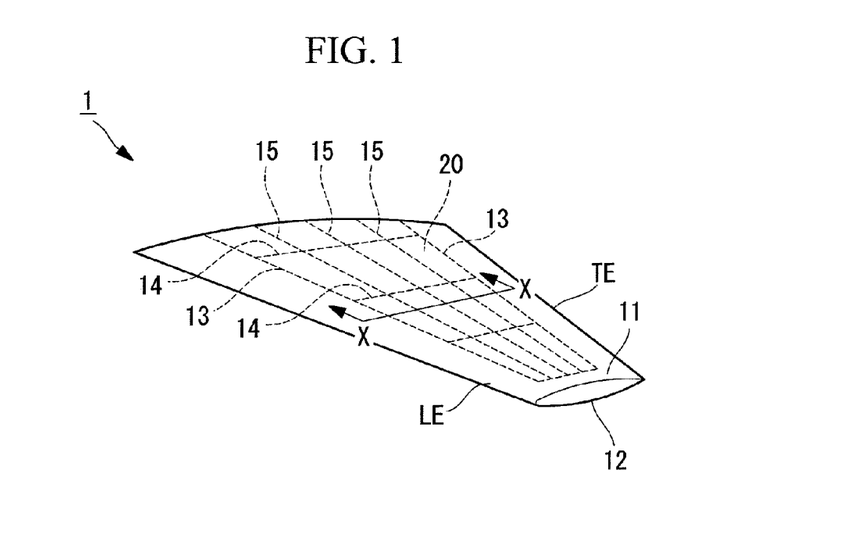
{FIG. 1} A perspective view describing the structure of a main wing provided with a fuel tank according to an embodiment of the present invention.
Figure 2:
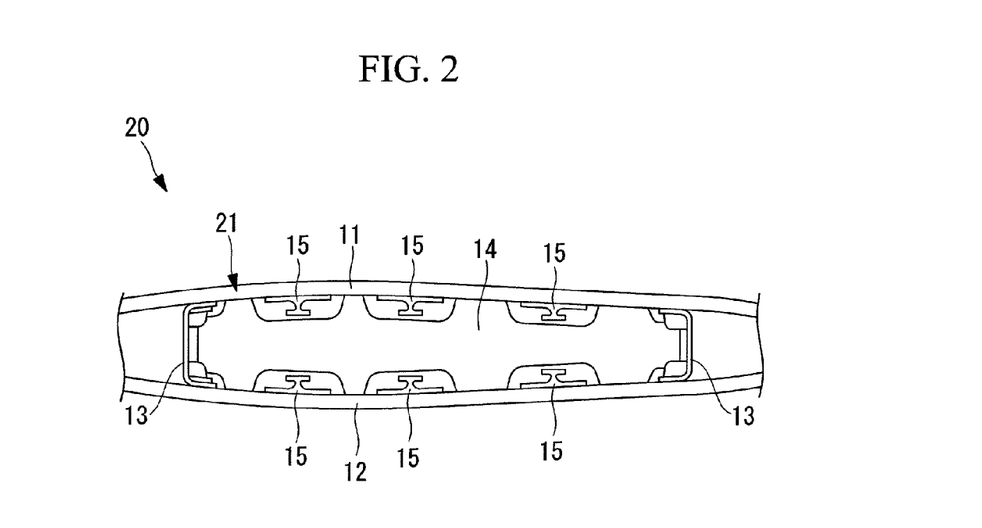
{FIG. 2} A cross-sectional view along the line X-X in FIG. 1 that further describes the structure of the fuel tank.

FIG. 1 is a perspective view describing the structure of a main wing provided with a fuel tank according to the present embodiment. FIG. 2 is a cross-sectional view along the line X-X in FIG. 1 that further describes the structure of the fuel tank.

The present embodiment describes the application of the present invention to an aircraft main wing (wing) 1 formed from a composite material such as a CFRP, wherein a fuel tank (composite tank) 20 is formed in an integral manner inside the wing.

As illustrated in FIG. 1 and FIG. 2, the main wing 1 comprises mainly an upper skin panel 11, a lower skin panel 12, spars 13, ribs 14, and stringers 15. The upper skin panel 11, the lower skin panel 12, the spars 13, the ribs 14 and the stringers 15 also constitute the wing box that represents the main structural region of the main wing 1.

Moreover, a fuel tank 20 is formed inside the main wing 1 as an integral part of the main wing 1.

The upper skin panel 11 and the lower skin panel 12 are thin panels that form the outer shape of the main wing 1, and together with the spars 13, the ribs 14 and the stringers 15, absorb portions of the tensile load and compressive load that act upon the main wing 1.

The upper skin panel 11 is a thin panel that constitutes the upper surface of the main wing 1, whereas the lower skin panel 12 is a thin panel that constitutes the lower surface of the main wing 1.

As illustrated in FIG. 1 and FIG. 2, the spars 13 are structural members that extend along the lengthwise direction of the main wing 1 (the direction perpendicular to the page in FIG. 2), and are disposed across the space between the upper skin panel 11 and the lower skin panel 12.

This embodiment describes an example in which the spars 13 are positioned along the leading edge (LE) and the trailing edge (TE) of the main wing 1.

As illustrated in FIG. 1 and FIG. 2, the stringers 15 are auxiliary members that extend along the lengthwise direction of the main wing 1 (the direction perpendicular to the page in FIG. 2) in the space between the two spars 13, and are disposed between the upper skin panel 11 and the lower skin panel 12.

Moreover, the spars 13 and the stringers 15 transmit bending and twisting forces that act upon the main wing 1 in a front-rear direction or top-bottom direction to the aircraft fuselage (not shown in the drawings) to which the main wing 1 is attached.

As illustrated in FIG. 1 and FIG. 2, the ribs 14 are structural members that extend across the chord direction of the main wing 1 (the left-right direction in FIG. 2), and are disposed between the upper skin panel 11 and the lower skin panel 12. In other words, the ribs 14 are structural members that extend in a substantially orthogonal direction to the spars 13, and are plate-like members that are formed in the cross-sectional shape of the main wing 1.

Figure 3:
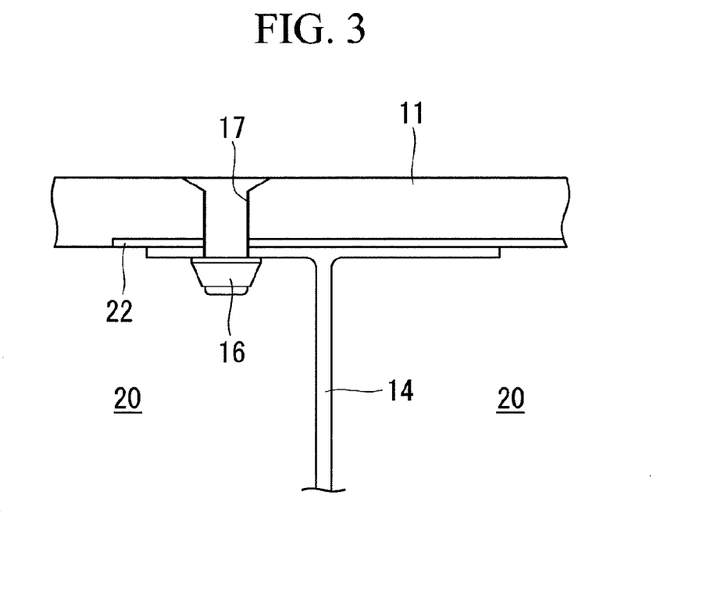
{FIG. 3} A cross-sectional view describing the structure of a joint between an upper skin panel and a rib in FIG. 2.

FIG. 3 is a cross-sectional view describing the structure of a joint between the upper skin panel and a rib from FIG. 2. FIG. 3 represents one possible combination of members, and illustrates a state wherein the rib 14 and the upper skin panel 11 are fastened together with a fastener 16.

The spars 13, the stringers 15 and the ribs 14 are fastened to the upper skin panel 11 and the lower skin panel 12 using fasteners 16 formed from metal, such as rivets.

Each fastener 16 has a shank portion having a circular cylindrical shape, a head portion that has a larger diameter than the shank portion and is located at one end of the shank portion, and a tail portion that is located at the other end of the shank portion and is fastened using a collar or the like. The shank portion is inserted into a through-hole 17 formed in the upper skin panel 11 and the rib 14, the tail portion is disposed on the inner surface of the rib 14, and the head portion is disposed on the outer surface of the upper skin panel 11.

As illustrated in FIG. 1 and FIG. 2, the fuel tank 20 is a tank inside which the fuel (combustible material) for the aircraft is stored, and is an integral tank formed inside the main wing 1 as an integral part of the main wing 1.

As illustrated in FIG. 1 to FIG. 3, the fuel tank 20 comprises a tank body 21 and an inner surface layer (the second resin portion) 22.

The tank body 21 is a container for storing fuel that is formed mainly from the upper skin panel (first resin portion) 11, the lower skin panel (first resin portion) 12, the spars (first resin portion) 13 and the stringers (first resin portion) 15, all of which are formed mainly from a CFRP, and the ribs (metal portion) 14 that are formed mainly from an aluminum alloy. The tank body 21 is formed as an integral part of the main wing 1.

The upper skin panel 11, the lower skin panel 12, the spars 13 and the stringers 15 may be formed mainly from a CFRP in the manner described above, or at least one of the upper skin panel 11, the lower skin panel 12, the spars 13, the ribs 14 and the stringers 15 may be formed mainly from a CFRP, and there are no particular limitations on the actual configuration employed.

There are no particular limitations on the structure of the tank body 21, which may be formed as an integral part of the main wing 1 in the manner described above, by combining the structural elements such as the upper skin panel 11, the lower skin panel 12, the spars 13, the ribs 14 and the stringers 15, may be formed as a separate body from the main wing 1 by adding other structural elements besides those mentioned above, or may have a structure in which a portion of the above structural elements have been substituted with other structural elements.

The upper skin panel 11 and the lower skin panel 12 are panel-like members formed from a CFRP. As illustrated in FIG. 3, the inner surface layer 22 is provided on the inside surfaces of the upper skin panel 11 and the lower skin panel 12, namely the surfaces that contact the fuel.

Moreover, through-holes 17 through which the shank portions of the fasteners 16 are inserted are formed in the upper skin panel 11, the lower skin panel 12 and the inner surface layer 22.

In the structure of the present embodiment, the inner surface layer 22 is disposed on the inner surfaces of the upper skin panel 11 and the lower skin panel 12, and on the surfaces of the spars 13 and the stringers 15, and is composed of a GFRP that uses an epoxy-based resin as the matrix and a glass fiber as the reinforcing fiber. As illustrated in FIG. 3, the inner surface layer 22 is formed on at least those regions of the upper skin panel 11, the lower skin panel 12, the spars 13 and the stringers 15 that contact the ribs 14, and is also formed in those regions where the through-holes 17 through which the fasteners 16 are inserted are formed.

Accordingly, the inner surface layer 22 makes direct contact with the rib 14, and a through-hole 17 is formed in the inner surface layer 22.

The inner surface layer 22 must be formed in at least those regions that contact metal materials such as the ribs 14 and in regions in which through-holes 17 are formed, and the locations in which the inner surface layer 22 is formed is not necessarily limited to the inside surfaces of the upper skin panel 11 and the lower skin panel 12 and the surfaces of the spars 13 and the stringers 15.

Figure 4:
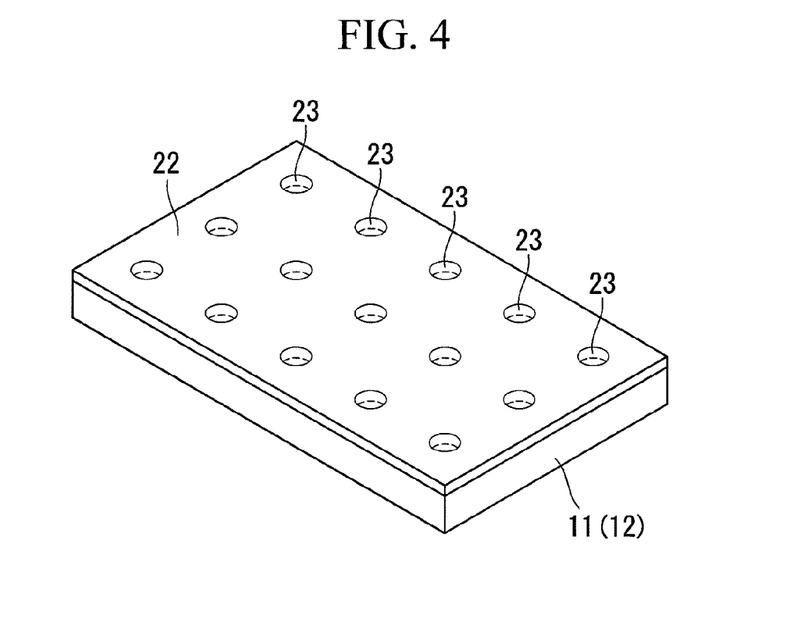
{FIG. 4} A schematic illustration describing the structure of conductive portions formed in an inner surface layer shown in FIG. 3.

FIG. 4 is a schematic illustration describing the structure of conductive portions formed within the inner surface layer of FIG. 3.

As illustrated in FIG. 4, the inner surface layer 22 is provided with a plurality of conductive portions 23.

The conductive portions 23 are portions that lack the glass fibers that act as the reinforcing fiber within the inner surface layer 22, and as such, are portions formed solely from the epoxy resin matrix. The conductive portions 23 comprise a plurality of circular shaped portions having a diameter of 1 mm or 3 mm, and as illustrated in FIG. 4, these portions are arranged in a matrix-type pattern with a pitch of approximately 10 mm.

In this embodiment, the conductive portions 23 are formed via the steps described below.

First, the glass fibers used in forming the inner surface layer 22 are intersected to make a planar woven fabric, and a portion of the glass fibers are then removed from the fabric, thus forming a fabric having through-holes formed therein. Examples of the method used for removing the portion of glass fibers include methods of forming circular holes in the woven fabric of glass fibers using a hole punch or the like, and methods in which a portion of the glass fibers are pulled out of the woven fabric.

A prepreg is then formed by impregnating the woven fabric having the through-holes formed therein with an epoxy resin matrix.

Subsequently, the prepreg is laid up (laminated) on the first resin portion or the uncured first resin portion, and the conductive portions 23 are then formed by curing the resin.

The size of the conductive portions 23 and the pitch at which the conductive portions 23 are arranged are not limited to the values mentioned above, and other values may be used.

There are no particular limitations on the fiber reinforced plastic used for forming the inner surface layer 22, and other plastics that may be used include fiber reinforced plastics that use an epoxy resin as the matrix and use polyester fibers, cotton fibers or nylon fibers as the reinforcing fibers, and fiber reinforced plastics that use a polyimide resin as the matrix and use glass fibers, polyester fibers, cotton fibers or nylon fibers as the reinforcing fibers.

Other possible steps that may be used for forming the conductive portions 23 include the two examples described below.

In the first example, first, the glass fibers used in forming the inner surface layer 22 are intersected to make a planar woven fabric, and a prepreg is then formed by impregnating the woven fabric with an epoxy resin matrix.

Subsequently, a portion of the glass fibers are removed from the prepreg, thus forming the portions that become the conductive portions 23. At this time, in a similar manner to that described above for the case where a portion of the glass fibers are removed from a woven fabric formed from the glass fibers, examples of the method used for removing the portion of glass fibers include methods of forming circular holes using a hole punch or the like, and methods in which a portion of the glass fibers are pulled out of the prepreg.

Subsequently, the prepreg is laid up (laminated) on the first resin portion or the uncured first resin portion, and the conductive portions 23 are then formed by curing the resin.

In the second example, first, the glass fibers used in forming the inner surface layer 22 are intersected to make a planar woven fabric, and a prepreg is then formed by impregnating the woven fabric with an epoxy resin matrix.

The resin impregnated within the prepreg is then cured.

Subsequently, pinholes that function as the conductive portions 23 are formed in the inner surface layer 22, either physically or by application of a voltage. An example of a method for physically forming the pinholes that function as the conductive portions 23 is a method in which the pinholes are formed using a needle-shaped tool.

Next is a description of the actions of the main wing 1 and the fuel tank 20 having the structures described above.

In a state where fuel is stored inside the fuel tank 20, movement or the like of the fuel can generate flow electrification of the tank body 21 that form the fuel tank 20 and the inner surface layer 22.

Because the upper skin panel 11 and the lower skin panel 12 of the tank body 21 are formed from a CFRP that contains conductive carbon fibers, any charging of the upper skin panel 11 and the lower skin panel 12 due to flow electrification is transmitted into the atmosphere or to other structural members besides those that constitute the fuel tank 20.

On the other hand, in the present embodiment, the ribs 14 inside the tank body 21 are formed from a conductive aluminum alloy, and therefore in a similar manner to the upper skin panel 11 and the lower skin panel 12, charging due to flow electrification is transmitted to other structural members besides those that constitute the fuel tank 20.

The present embodiment describes an example in which the present invention is applied to a combination of ribs 14 formed from a conductive aluminum alloy, the upper skin panel 11 and the lower skin panel 12, but the invention is not limited to this configuration, and may also be applied to other combinations, including a combination of ribs 14 formed from a CFRP and metal components, a combination of the upper skin panel 11, the lower skin panel 12 and metal components, a combination of spars 13 formed from a CFRP and metal ribs 14, a combination of spars 13 formed from a CFRP and metal components, and a combination of stringers 15 formed from a CFRP and metal components.

The inner surface layer 22 is formed from a GFRP that uses glass fibers as the reinforcing fiber, and these glass fibers exhibit lower conductivity than carbon fibers. Accordingly, the inner surface layer 22 is more prone to electrification than the upper skin panel 11 and the lower skin panel 12.

However, because the conductive portions 23 are formed in the inner surface layer 22, a portion of the charge that might be expected to accumulate on the inner surface layer 22 is transmitted to the upper skin panel 11 and the lower skin panel 12 via the conductive portions 23, thus limiting the charge accumulated on the inner surface layer 22.

Figure 5:
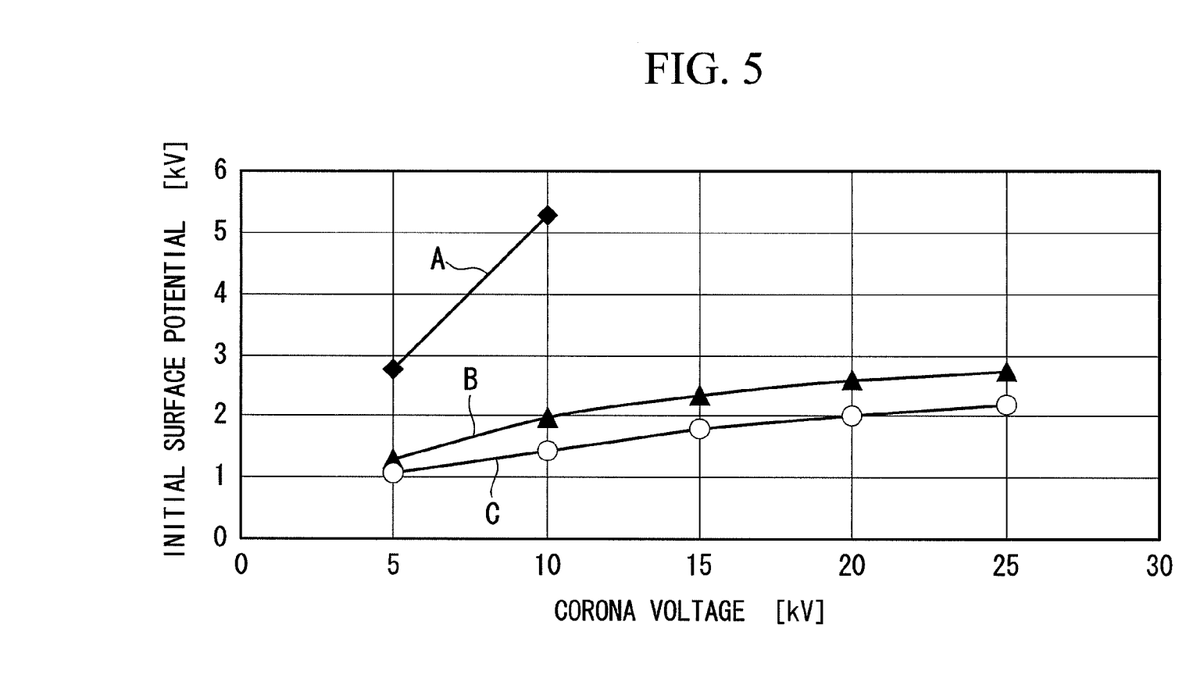
{FIG. 5} A graph describing the initial surface potential of GFRP samples relative to the corona voltage from a corona charging apparatus.

FIG. 5 is a graph describing the initial surface potential of GFRP samples relative to the corona voltage from a corona charging apparatus.

The following description details the results when the surface of the GFRP used in forming the inner surface layer 22 is electrified with a charge using a corona charging apparatus, and describes the variation in the initial surface potential of the GFRP when the corona voltage is altered.

In FIG. 5, graph A describes the initial surface potential of GFRP, graph B describes the initial surface potential of a GFRP in which conductive portions 23 having a diameter of approximately 1 mm have been formed, and graph C describes the initial surface potential of a GFRP in which conductive portions 23 having a diameter of approximately 3 mm have been formed.

The distance between adjacent conductive portions 23 in the graph B and the graph C is approximately 10 mm to approximately 13 mm. Further, the initial surface potential values illustrated in FIG. 5 each represents the average value of 5 measured results.

Electrification of the GFRP is performed by corona discharge, and the voltage during the corona discharge is within a range from 5 kV to 25 kV.

First is a description of the GFRP results. As illustrated in graph A, a corona discharge of 10 kV generates a surface potential of approximately 5.3 kV. At corona voltages greater than 10 kV, the surface potential becomes overly large and there is a danger of an electrostatic discharge, and therefore no tests were performed.

Next is a description of the results for the GFRP in which conductive portions 23 having a diameter of approximately 1 mm have been formed. As illustrated in graph B, a corona discharge of 10 kV generates a surface potential of approximately 2.0 kV on the GFRP. Further, a corona discharge of 25 kV generates a surface potential of approximately 2.7 kV.

Finally is a description of the results for the GFRP in which conductive portions 23 having a diameter of approximately 3 mm have been formed. As illustrated in graph C, a corona discharge of 10 kV generates a surface potential of approximately 1.4 kV on the GFRP. Further, a corona discharge of 25 kV generates a surface potential of approximately 2.2 kV.

According to the structure described above, because the conductive portions 23 are provided within the inner surface layer 22, the electric charge borne by the inner surface layer 22 is reduced compared with the case where the conductive portions 23 are not provided.

In the present embodiment, when a liquid such as a fuel is stored in the tank body 21, flow electrification occurs on the inner surface of the tank body. Because the glass fibers incorporated within the GFRP that constitutes the inner surface layer 22 have a higher electrical resistivity than the carbon fibers incorporated within the CFRP that constitutes the upper skin panel 11, the lower skin panel 12, the spars 13 and the stringers 15 (hereinafter jointly referred to using the expression "the upper skin panel 11 and the like"), the inner surface layer 22 bears an electrical charge more readily than the upper skin panel 11 and the like formed from CFRP. At this time, when the amount of charge in the vicinity of a conductive portion in the inner surface layer 22 reaches a certain value, the charge borne by the inner surface layer 22 is transferred to the upper skin panel 11 and the like via the conductive portion 23. As a result, charge accumulation on the inner surface layer 22 can be suppressed.

Because the inner surface layer 22 is disposed so as to cover the regions where the upper skin panel 11 and the like adjoin the ribs 14, or in other words, because the inner surface layer 22 is interposed between the upper skin panel 11 and the like and the ribs 14, corrosion of the ribs 14, which are formed from an aluminum alloy, can be suppressed.

In other words, the inner surface layer 22 functions as a layer that isolates those materials having differing electric potentials that are capable of generating a local cell that causes bimetallic corrosion, namely a layer that isolates the upper skin panel 11 and the like from the ribs 14. As a result, the metal material such as the aluminum alloy that constitutes the ribs 14 is more resistant to ionization than in the case where the upper skin panel 11 and the like and the ribs 14 make direct contact.

Further, because the electrical resistivity of the glass fibers incorporated within the inner surface layer 22 is higher than that of the carbon fibers incorporated within the upper skin panel 11 and the like, corrosion of the ribs 14, which are formed from a metal material such as an aluminum alloy, is less likely to occur than in the case where the upper skin panel 11 and the like make direct contact with the ribs 14.

Moreover, because the upper skin panel 11 and the like are covered with the inner surface layer 22, even if, for example, through-holes 17 or the like that are used for fastening the ribs 14, the upper skin panel 11 and the like, and the inner surface layer 22 are formed by processing, the generation of burrs at the processed portions such as the through-holes 17 can be suppressed. Accordingly, degradation in the strength of the fuel tank 20 due to burr generation can be suppressed.

Because the conductive portions 23 are filled with the epoxy resin matrix, corrosion of the ribs 14 that are formed from a metal material such as an aluminum alloy can be better suppressed than the case where, for example, through-holes provided in the inner surface layer 22 are used as the conductive portions 23.

In other words, because the upper skin panel 11 and the like are covered with the conductive portions 23 that are formed solely from epoxy resin, the upper skin panel 11 and the like make no contact with any moisture or the like contained within the combustible material. Accordingly, the ribs 14 cannot make electrical contact with the carbon fibers incorporated within the upper skin panel 11 and the like via such moisture, meaning corrosion of the ribs 14 is inhibited.

Because the conductive portions 23 are formed by removing a portion of the glass fibers and then performing impregnation with the epoxy resin, the conductive portions 23 can be formed easily, without subjecting the inner surface layer 22 to cutting work.

Specifically, by forming a woven fabric in which the glass fibers are arranged in a planar pattern, forming portions in which the glass fibers have been removed, and then impregnating the fibers with an epoxy resin, the inner surface layer 22 and the conductive portions 23 are formed in an integrated manner. As a result, conductive portions 23 can be formed that are formed solely from the epoxy resin and penetrate from the surface of the inner surface layer 22 that contacts the fuel through to the upper skin panel 11 and the like.

Alternatively, a portion of the glass fibers may be removed from a prepreg that is formed by impregnating a woven fabric that constitutes the inner surface layer 22 with an epoxy resin matrix, thereby forming portions that become the conductive portions 23. By using this method, the conductive portions 23 can be formed easily, without subjecting the inner surface layer 22 to cutting work.

Specifically, by forming a woven fabric in which the glass fibers are arranged in a planar pattern, impregnating the fibers with an epoxy resin to form a prepreg, and then removing a portion of the glass fibers from the prepreg, the inner surface layer 22 and the conductive portions 23 are formed in an integrated manner. As a result, conductive portions 23 can be formed that are formed solely from the epoxy resin and penetrate from the surface of the inner surface layer 22 that contacts the fuel through to the upper skin panel 11 and the like.

Moreover, the woven fabric that constitutes the inner surface layer 22 may be impregnated with an epoxy resin matrix, the resin then cured, and pinholes that function as the conductive portions 23 then formed in the inner surface layer 22, either physically or by application of a voltage.

The technical scope of the present invention is not limited by the embodiment described above, and various modifications can be made without departing from the scope of the present invention.

For example, the above embodiment describes the case in which the composite tank of the present invention is applied to a fuel tank 20 that is formed as an integral part of a main wing 1, but the invention is not limited to fuel tanks 20 that are formed as an integral part of a main wing 1, and can also be applied to various other tanks in which combustible materials are stored.

REFERENCE SIGNS LIST

1 Main wing (wing)
11 Upper skin panel (first resin portion)
12 Lower skin panel (first resin portion)
13 Spar (first resin portion)
14 Rib (metal portion)
15 Stringer (first resin portion)
20 Fuel tank (composite tank)
21 Tank body
22 Inner surface layer (second resin portion)
23 Conductive portion

The invention claimed is:

1. A composite tank comprising:
a tank body inside which a combustible material is stored, the tank body having a first resin portion formed from a fiber reinforced resin, and a metal portion formed from a metal material,
a second resin portion formed from a fiber reinforced resin, which covers at least those regions on an inner surface of the tank body where the first resin portion adjoins the metal portion, the second resin portion including a combustible-material-contacting surface that contacts the combustible material, and
a plurality of conductive portions that are provided within the second resin portion in such a way as to enable charge transfer through the second resin portion, from the combustible-material-contacting surface of the second resin portion through to the first resin portion,
wherein fiber incorporated within the second resin portion has a higher electrical resistivity that fiber incorporated within the first resin portion, and the second resin portion forms a layer that isolates the first resin portion from the metal portion, and
wherein the conductive portions are portions without the fibers in the second resin portion, are formed solely of the resin, and extend from the combustible-material-contacting surface through to the resin portion.

2. The composite tank according to claim 1, wherein the second resin portion is formed by arranging the fibers in a planar pattern and then impregnating the fibers with the resin.

3. A wing, which is provided with the composite tank according to claim 1, wherein
the first resin portion of the composite tank constitutes at least a portion of a wing box.

4. The composite tank according to claim 1, wherein when the amount of charge in the vicinity of the conductive portions in the second resin portion reaches a certain value, the conductive portions transfers the charge borne by the second resin portion to the first resin portion via the conductive portions.

* * * * *